Feb. 24, 1931.   L. VON REIS   1,793,977
TRAVELING TRANSPORTING TABLE FOR PLASTIC GLASS PLATES
Original Filed May 28, 1928
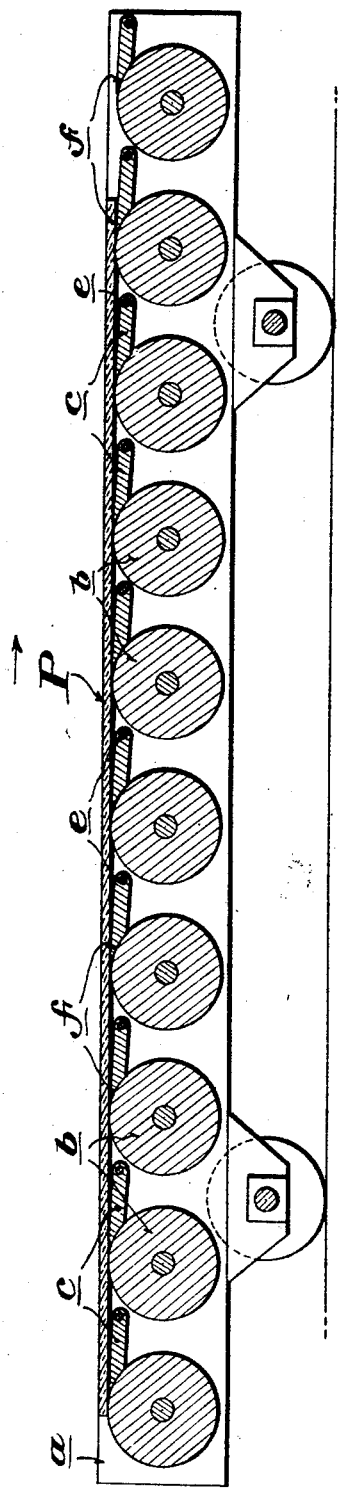
Inventor
Lambert von Reis,
By
Attorneys Patented Feb. 24, 1931

1,793,977

UNITED STATES PATENT OFFICE

LAMBERT von REIS, OF HERZOGENRATH, GERMANY, ASSIGNOR, BY MESNE ASSIGNMENTS, TO THE AMERICAN BICHEROUX COMPANY, A CORPORATION OF DELAWARE

TRAVELING TRANSPORTING TABLE FOR PLASTIC GLASS PLATES

Original application filed May 28, 1928, Serial No. 281,289, and in Germany May 30, 1927. Divided and this application filed June 8, 1929. Serial No. 369,415.

The transporting of glass plates, for instance, from the place of formation to and through the lehr for annealing, is generally carried out by means of traveling transporting tables or roller conveyors, the upper surfaces of which form the receiving surface for the plastic sheet. Traveling tables possess over roller conveyors, the advantage of allowing the lehr to be erected at any desired point, irrespective of the position of the sheet glass forming machine, while with the use of a roller conveyor, the lehr must be situated substantially in a straight line with the machine. A greater advantage in using traveling transporting tables lies in the fact that more than one lehr may be arranged at various places for co-operation with one and the same forming machine, as the tables may easily be run to the entrance of one or another of a plurality of lehrs. By using traveling transporting tables, it is possible to push a table with a glass plate on it in and out of the way and to allow the plate to remain on the table until it has solidified sufficiently to go through the lehr, and in the meantime, another traveling transporting table may be run up to the plate forming machine to receive the product of the forming machine. Traveling transporting tables heretofore used have had their receiving surface for the sheet glass made of a slab or of a series of rollers. They have also been made with rollers, the spaces between the rollers being filled by bridges. Now the present invention has for its object to provide a traveling transporting table for plastic glass plates, and the essential feature of the invention resides in the fact that the bridge members between the conveying rollers are of a peculiar construction as will be more fully set out hereinafter.

The drawing is a diagrammatic side elevation of a glass plate transporting table constructed in accordance with the invention.

The table consists of a wheeled frame $a$, in which a series of rollers $b$ are mounted so as to form the receiving surface for the sheet of plastic glass to be transported on the table. In between the rollers $b$, and slightly below their upper surfaces are the bridge members $c$ which serve to prevent the head of the plastic sheet of glass from dropping down by gravity between two rollers. These bridge members are in the form of metal plates pivotally supported at one of their longitudinal edges by pins $e$ and loosely resting on the adjacent roller by its longitudinal edge $f$. The last mentioned edge $f$ of the plates are tapered in shape so as to have the shape and fit tightly to the surface of the roller so that the head of the plate of plastic glass in its movement over the table will not be caught between the roller and the bridge member. These bridge members are slightly inclined in the direction of the movement of the glass as indicated by the arrow, to facilitate the sliding of the head of the plastic sheet from one roller to the other. P represents a sheet of glass.

The rollers forming the conveyor may either be freely rotatable or positively driven at variable speeds by means of any suitable gearing and drive. In the latter case it is preferable to drive the rollers $b$ of the conveyor at rolling speed when the table is receiving a glass plate from a forming machine, and to drive the rollers of the conveyor at annealing speed when it is desired to convey the plate from the table into a lehr.

While these bridge members in the form of plates here are shown in connection with a transporting table, bridge members of this kind can be used equally well in a stationary conveyor.

This application is a division of my application Sr. No. 281,289, filed May 28th, 1928, and is directed to the subject matter of Figure 4 of that case.

Having thus described my invention what I claim is:—

1. A transporting table for plastic glass plates, comprising a wheeled frame, a series of spaced parallel rollers rotatably mounted in the frame and forming the table top, and plates to bridge the spaces between the rollers, these plates being inclined in the direction of feed of the glass and pivotally supported at their lower longitudinal edges, while their upper longitudinal edges are tapered and arranged to rest on the surfaces of the rollers.

2. In a conveying device for plastic sheet glass, the combination of a series of spaced parallel rollers to support and convey said plastic sheet, and plates to bridge the spaces between the several rollers, said plates being inclined in the direction of feed of the glass and pivotally supported at their lower longitudinal edges, while their upper longitudinal edges have the shape of the roller on which it rests.

In testimony whereof I hereunto affix my signature.

LAMBERT von REIS.